(12) United States Patent
MacLaughlin

(10) Patent No.: US 9,720,103 B2
(45) Date of Patent: Aug. 1, 2017

(54) USE OF VERTICALLY ALIGNED CARBON NANOTUBE ARRAYS FOR IMPROVED X-RAY IMAGING DETECTOR PERFORMANCE

(71) Applicant: Carestream Health, Inc., Rochester, NY (US)

(72) Inventor: Scott T. MacLaughlin, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 4 days.

(21) Appl. No.: 14/811,871

(22) Filed: Jul. 29, 2015

(65) Prior Publication Data

US 2017/0031037 A1    Feb. 2, 2017

(51) Int. Cl.
*G01T 1/20* (2006.01)
*G01T 7/00* (2006.01)

(52) U.S. Cl.
CPC .......... *G01T 1/2018* (2013.01); *G01T 1/2002* (2013.01); *G01T 7/00* (2013.01)

(58) Field of Classification Search
None
See application file for complete search history.

(56) References Cited

U.S. PATENT DOCUMENTS

| | | | |
|---|---|---|---|
| 4,827,136 A | 5/1989 | Bishop, Jr. et al. | |
| 8,715,790 B2 | 5/2014 | Silva et al. | |
| 2006/0081775 A1* | 4/2006 | Joyce | H01J 49/147 250/288 |
| 2007/0080299 A1* | 4/2007 | Endo | G01T 1/2018 250/370.09 |
| 2009/0016580 A1* | 1/2009 | Yamamichi | A61B 6/502 382/128 |
| 2011/0262772 A1* | 10/2011 | Hauge | B29C 43/22 428/688 |
| 2012/0213994 A1* | 8/2012 | Jafry | B82Y 30/00 428/367 |
| 2013/0134316 A1* | 5/2013 | Nakatsugawa | G01T 1/202 250/366 |
| 2014/0064454 A1* | 3/2014 | Hammond | H05G 1/44 378/96 |
| 2014/0238477 A1 | 8/2014 | Fucinato | |
| 2015/0008330 A1 | 1/2015 | MacLaughlin et al. | |

FOREIGN PATENT DOCUMENTS

WO    WO 01/76228 A1    10/2001

OTHER PUBLICATIONS

Lenntech, "Chemical elements listed by melting point," Retrieved from Internet [Sep. 29, 2016]; Retrieved from url <www.lenntech.com/periodic-chart-elements/melting-point.htm>.*

(Continued)

*Primary Examiner* — Yara B Green

(57) ABSTRACT

A planar radiographic imaging device has electromagnetic radiation sensitive elements disposed in a two-dimensional array. A housing encloses the two-dimensional array of radiation sensitive elements and includes a layer of aligned carbon nanotubes on a surface thereof.

20 Claims, 12 Drawing Sheets

(56) References Cited

OTHER PUBLICATIONS

Joshi et al., "Assembly of one dimensional inorganic nanostructures into functional 2D and 3D architectures. Synthesis, arrangement, and functionality." Chem Soc Review, 2012, vol. 41, pp. 5285-5312.*

John H. Lehman et al., "Far infrared thermal detectors for laser radiometry using a carbon nanotube array," Applied Optics, Jul. 20, 2011, pp. 4099-4101.

Kenneth K. S. Lau et al., "Superhydrophobic Carbon Nanotube Forests," American Chemical Society, Nano Letters, 2003, vol. 3, No. 12, pp. 1701-1705.

International Search Report for International Application No. PCT/US2016/033398 mailed Sep. 5, 2016, 3 pages.

* cited by examiner

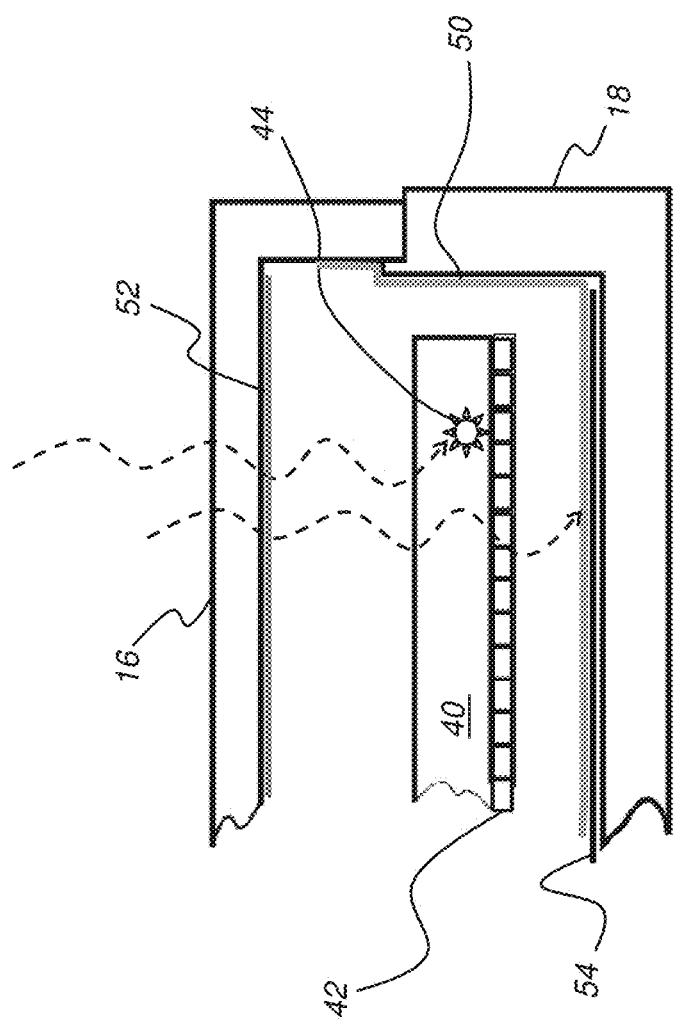

USE OF VERTICALLY ALIGNED CARBON NANOTUBE ARRAYS FOR IMPROVED X-RAY IMAGING DETECTOR PERFORMANCE

FIELD OF THE INVENTION

The invention relates generally to the field of medical imaging and more particularly relates to apparatus and methods for treating an x-ray detector to reduce scattering of electromagnetic radiation.

BACKGROUND

Computed radiography (CR) and digital radiography (DR) imaging processes provide image content by converting received short wavelength x-ray energy to photoluminescent energy at higher spectral wavelengths, such as visible light energy. In CR, the energy from x-ray radiation is stored temporarily in a photostimulable storage phosphor medium for later release under an excitation light source and reading by an array of photodetectors. In DR, the energy from x-ray radiation can be converted directly to light energy as it is received; the emitted light energy from a scintillator layer in the DR device is then detected by a photodetector array that is adjacent to the scintillator layer.

Light scatter presents an obstacle to obtaining accurate pixilated data from either the CR storage phosphor plate or the DR detector scintillator layer. Some of the light energy that is stimulated from the light emitting material is not directed at angles that allow it to be directly sensed by detector circuitry, but radiates elsewhere within the image reading apparatus. This scattered light can contribute to image noise and degrade image contrast and overall image quality.

Various measures are taken to help prevent stray light from repeated reflection within the DR detector or CR reading apparatus, as well as to help keep ambient light from the detector circuitry. The image detection circuitry is typically protected from ambient light entry by design practices that provide covers, seals and gaskets, and other light-limiting features. Within the CR reading chamber or DR detector housing, non-reflective paints and coatings are typically provided, helping to absorb, rather than reflect, stray light from the photoluminescent materials themselves.

One inherent difficulty with any type of coated surface relates to reflectivity to electromagnetic radiation. Any smooth surface has been found to reflect light to some extent. Even light-absorbing paints and coatings exhibit some amount of reflection, unable to fully absorb incident light due to Fresnel reflection. By way of example, charcoal, normally considered to be a highly light-absorbent material, reflects as much as 4% of incident light. Even paints and coatings used for advanced aerospace imaging and measurement systems can exhibit reflectivity greater than about 0.5%. Within the confined space that is used for sensing stored or scintillated light from x-ray detectors, even very low levels of reflection can have a negative impact on image quality.

SUMMARY

An aspect of this application is to advance the art of medical digital radiography and to address, in whole or in part, at least the foregoing and other deficiencies of the related art.

It is another aspect of this application to provide in whole or in part, at least the advantages described herein.

Certain exemplary embodiments of the application address the need for reduction of reflection and of consequent scattered light levels for CR image readers and DR detection devices. Advantageously, embodiments of the application can help to suppress scattered light more effectively than with conventional coatings and without introducing problems that can result from various coatings processes, such as chemical outgassing or particle generation, for example. Various embodiments can also provide a light-absorbent coating that is physically robust and that can withstand contact and handling during device fabrication, assembly, and operation.

These objects are given only by way of illustrative example, and such objects may be exemplary of one or more embodiments of the invention. Other desirable objectives and advantages inherently achieved by the may occur or become apparent to those skilled in the art. The invention is defined by the appended claims.

According to one aspect of the disclosure, there is provided a planar radiographic imaging device comprising:

a plurality of electromagnetic radiation sensitive elements disposed in a two-dimensional array;

a housing enclosing the two-dimensional array of radiation sensitive elements; and a layer of aligned carbon nanotubes on a surface of the housing.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 3D is a side view that shows the DR detector wherein the CNT coating supplements the x-ray blocking of a lead shield layer.

DESCRIPTION OF EXEMPLARY EMBODIMENTS

Figure 1:
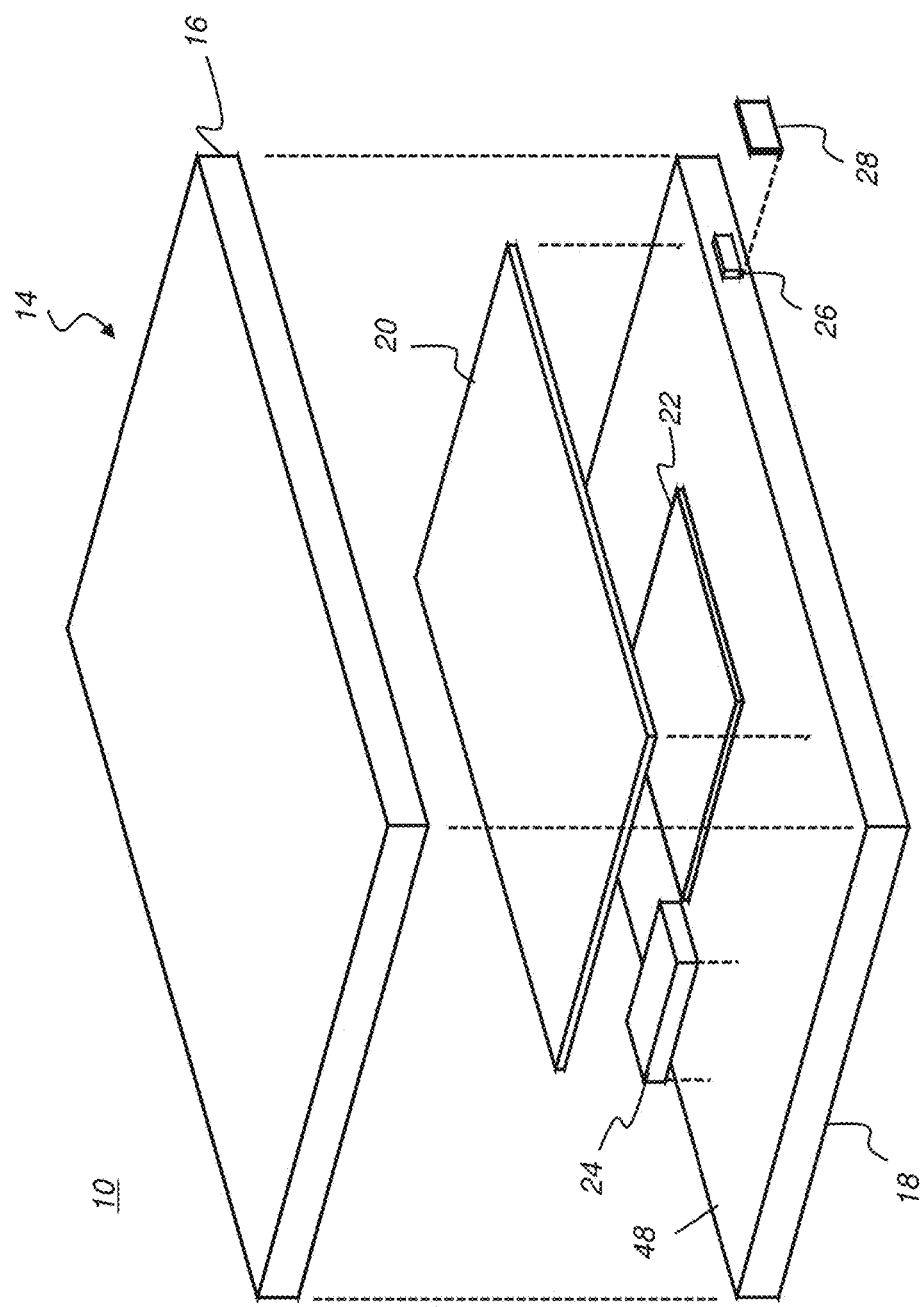
FIG. 1 is an exploded view that shows some of the components of a digital radiography (DR) detector.

The following is a description of exemplary embodiments, reference being made to the drawings in which the same reference numerals identify the same elements of structure in each of the several figures.

Where they are used in the present disclosure, the terms "first", "second", and so on, do not necessarily denote any ordinal, sequential, or priority relation, but are simply used to more clearly distinguish one element or set of elements from another, unless specified otherwise.

As used herein, the term "energizable" relates to a device or set of components that perform an indicated function upon receiving power and, optionally, upon receiving an enabling signal.

The exploded view of FIG. 1 shows, in simplified form, some of the electrically active internal components of a DR detector 10 that are protected within an enclosure or housing 14 formed using multiple parts, including top and bottom housing covers 16 and 18. A detector array 20 includes a scintillator layer that generates output light energy when energized by an x-ray exposure, and a two-dimensional array of electromagnetic radiation sensitive elements for capturing the output light energy and generating image signals therefrom. A circuit board 22 provides supporting control electronics for processing the image signals, generating image data, and wirelessly transmitting the image data to an external host computer system. A chargeable and/or replaceable battery 24 provides power, acting as the voltage source for detector 10 operations. A port 26 extending through bottom cover 18 is provided to allow an alternative electrical wired connection for transmitting data, and for receiving power such as from a voltage supply, which voltage supply may also be used to charge the battery 24. The port may have an optional cover plate or sealing cap 28, which may be a rubber seal or other liquid-proof material. In addition to the illustrated components, a number of interconnecting cables, supporting fasteners, cushioning materials, connectors, and other elements may be used for packaging and protecting the DR detector circuitry. An optional antenna and transmitter for wireless communication may alternately be provided within or as part of the housing 14. Top and bottom housing covers 16 and 18 may be fastened together along a mating surface 48. The housing 14 may comprise a material having a melting point of about 450° C. or greater.

Figure 2A:
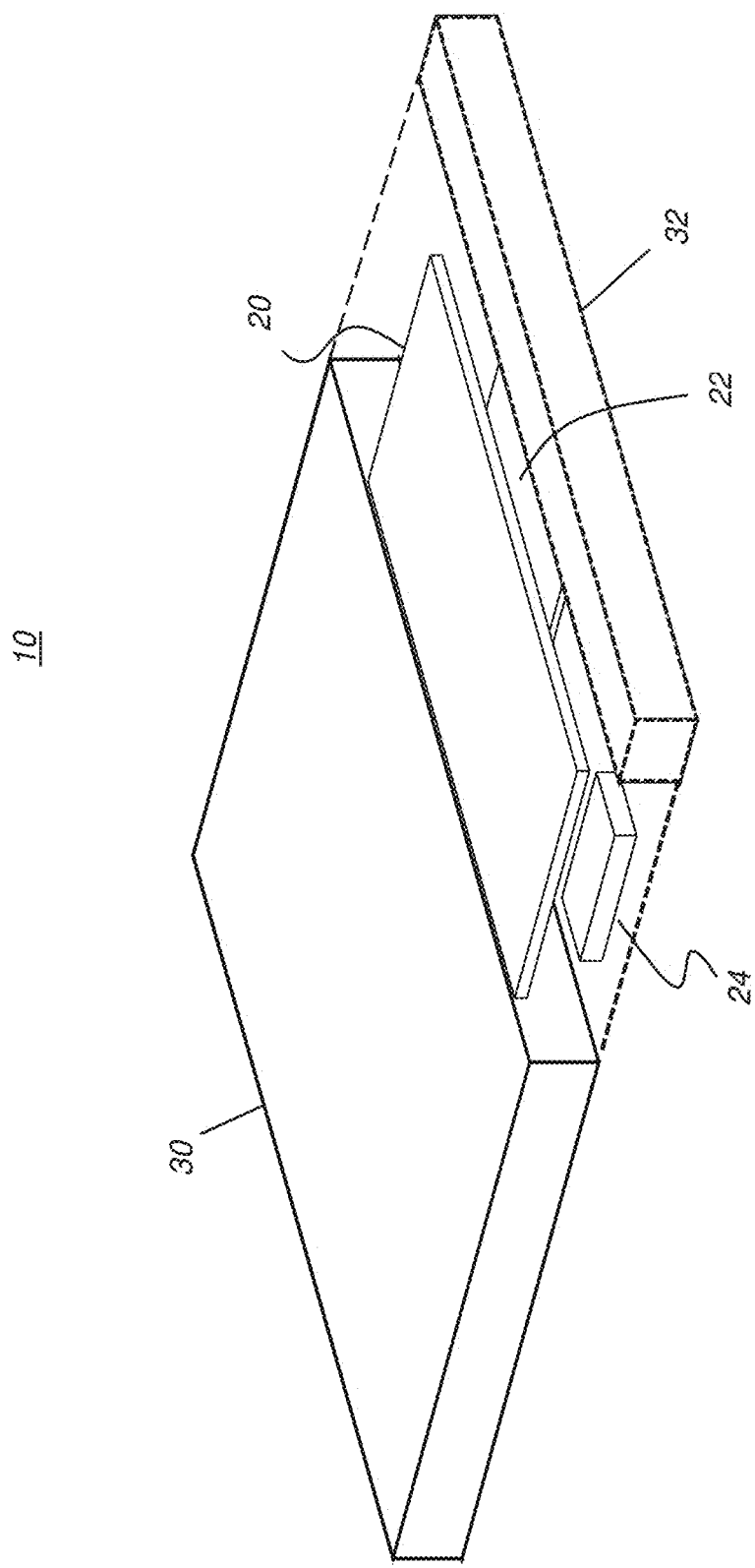
FIG. 2A is an exploded view that shows an alternate embodiment for DR detector packaging.

The exploded view of FIG. 2A shows an alternate embodiment of DR detector 10, in which detector array 20, circuit board 22, and battery 24, along with interconnection and other support components, slide into an encased cavity in an enclosure or housing 30 through an open end thereof. A lid 32 may be fastened to housing 30 to provide a protective seal.

Figure 2B:
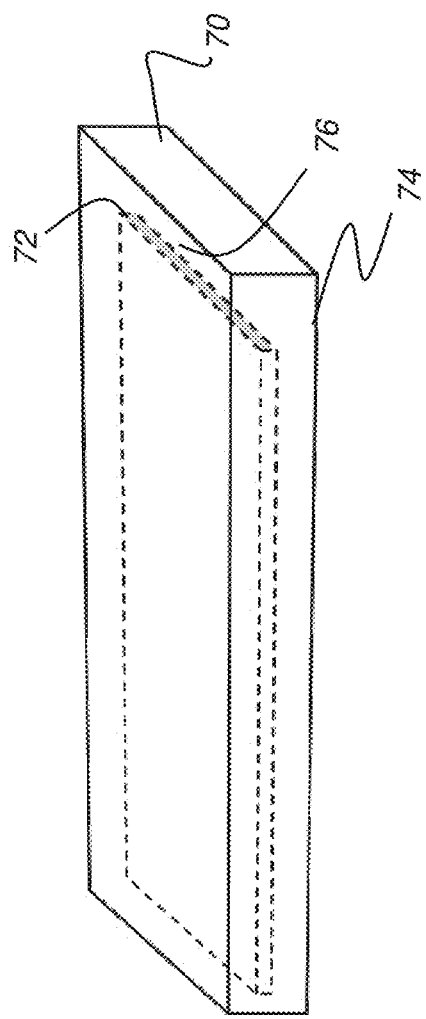
FIG. 2B shows a type of recording apparatus for computed radiography (CR) radiographic imaging.

FIG. 2B shows another type of recording apparatus for computed radiography (CR) radiographic imaging. A CR cassette 70 has a phosphor sheet 72 or plate that stores image information according to x-ray exposure; unlike the scintillator layer of detector array 20, phosphor sheet 72 stores exposure data for a finite time for later reading and erasure. A housing 74 encloses the recording medium during exposure and during transport to a reader device. Housing 74 includes internal surfaces 76 that face the recording medium, phosphor sheet 72. Phosphor sheet 72 is energized by being exposed to electromagnetic energy of selected wavelengths, whereby different levels of the electromagnetic energy is locally retained by the energized phosphor, which is then digitally read out to provide the radiography image data.

Figure 2C:
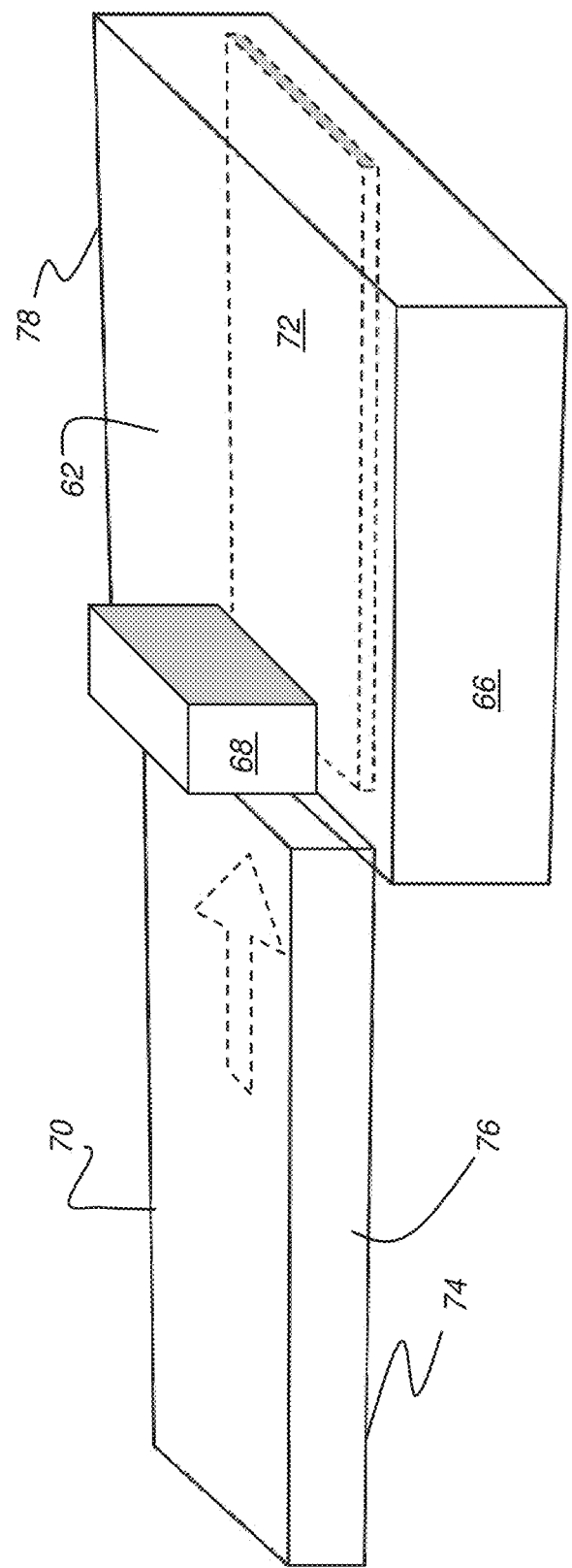
FIG. 2C is a schematic view that shows components of a CR reader apparatus for scanning the CR recording medium.

FIG. 2C shows yet another type of recording apparatus for CR imaging. A CR reader 66 briefly extracts phosphor sheet 72 from CR cassette 70 and routes the sheet 72 into a housing 78, past a scanner 68 that provides an excitation light to stimulate the storage phosphor on sheet 72 and thereby extract, or read out, locally retained radiography image data. Housing 78 has at least one internal surface 62 that faces phosphor sheet 72 and that can therefore be subject to scattered light during the readout operation.

Embodiments of the present disclosure address the need for reducing scattered light reflection within the DR detector 10 or CR scanner using a coating provided by an array of one or more layers of aligned carbon nanotubes on at least one or more surfaces of the housing, cassette, or scanner that face or surround the recording medium, either scintillator layer 40 (DR of FIG. 2A) or phosphor sheet 72 (CR of FIGS. 2B and 2C). Aligned carbon nanotubes (CNTs) provide a coating that can absorb nearly 100% of incident light, over the spectral range from ultraviolet (UV) to near-infrared (NIR) light having wavelengths ranging approximately from slightly below 380 nm to above 1000 nm.

Carbon nanotubes are formed as ordered arrangements of single layered carbon, also termed graphene, that are arranged in tubular fashion, having a number of possible angles and curvatures. Nanotube diameters can range from about 0.4 to 40 nm, with lengths variable, even exceeding several centimeters, allowing aspect ratios well above 1,000,000:1, for example. Single-walled carbon nanotubes can be considered as a graphene sheet that is rolled to a specific chiral angle with respect to a plane that is perpendicular to the CNT length. CNTs can be defined and specified by characteristics of diameter and chiral angle or by orientation of its component 6-member carbon ring. The angular arrangement of carbon atoms that form the CNT determine characteristic behavior of the CNT material, such as whether or not the CNT forms a conductor or semiconductor, for example. CNT structures are formed from single-walled graphene structures, but can be single-walled or multiple walled structures, such as where one narrower tube structure fits within a nanotube of larger radius. The structural arrangement that is provided can determine various performance characteristics, such as over what range radiant energy absorption is optimized, for example.

A number of light-absorbent paints and other coating materials are made having a percentage of CNT contents in their formulation. However, the CNT structures that are suspended in these coatings are in loose form and not aligned with each other, which makes these materials more susceptible to surface damage and limits their usefulness for reducing reflection. The CNTs of the present disclosure, however, are not loosely suspended in a coating solution, but have an aligned arrangement or "vertically aligned" form, as the term is understood and used by those skilled in the CNT fabrication arts. In aligned form, as the term implies, multiple CNT structures are formed in parallel to each other, extending outward ("vertically") from a surface and generally having height levels that are the same or vary only within a narrow range.

CNTs are grown on a substrate surface by a process that deposits a particulate catalyst on the surface, such as nickel, cobalt, or iron; provides a high temperature reducing atmosphere with a gaseous feedstock material that contains carbon, such as ethylene, ethanol, or methane; and applies a high energy such as a plasma to foster nanotube growth upwards from the metal catalyst sites on the surface. Plasma assisted photo-thermal chemical vapor deposition (PTCVD) is one method that has been successfully used to generate aligned CNTs using this approach. Recent process improvements, such as those described in U.S. Pat. No. 8,715,790 to Silva et al., have helped to reduce the needed temperature conditions for CNT growth and allow CNTs to be formed onto aluminum and other metallic surfaces, which patent is hereby incorporated by reference in its entirety as if fully set forth herein. One arrangement of CNT, termed VANTAblack for Vertically Aligned NanoTube Arrays, provides the most highly light absorbent material known, absorbing up to 99.965% of light radiation over the spectral range from UV to NIR.

Figure 3A:
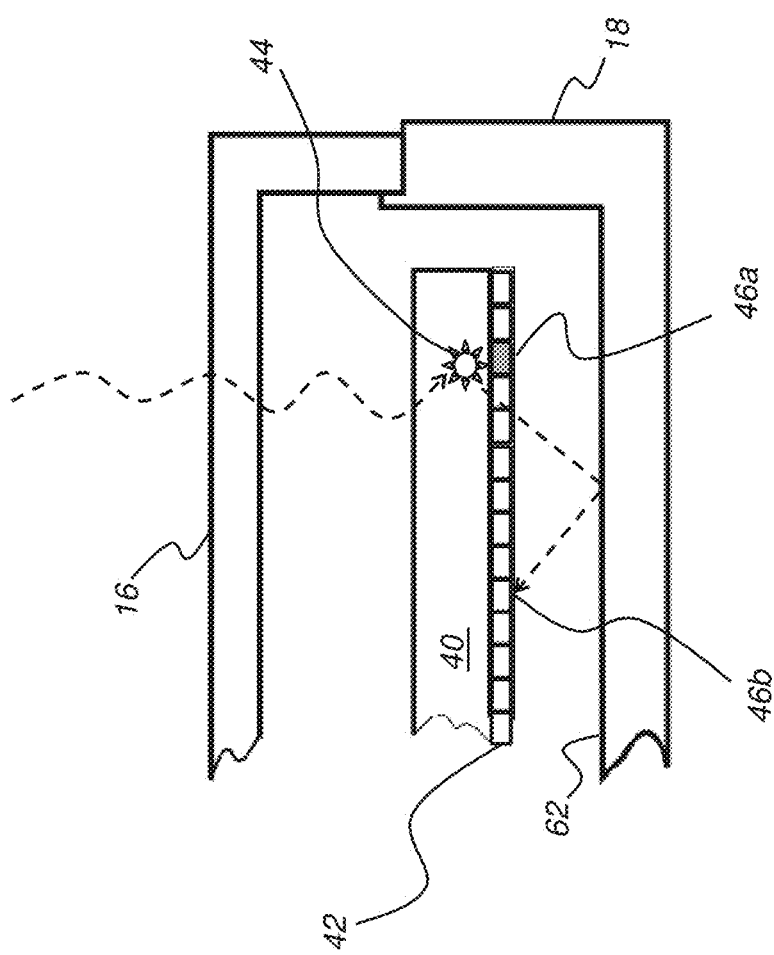
FIG. 3A is a side view that shows a portion of the DR detector to show light scattering.

FIG. 3A shows, from a cross-sectional side view, a small portion of DR detector 10 with aspects of detector 20 circuitry. Detector 20 has a scintillator layer 40 and a photodiode array 42. X-ray radiation excites scintillator material 44, causing a localized release of light energy. Most of the emitted light impacts photodiode 46a, as intended, so that the energy level of the signal at photodiode 46a corresponds to the intensity of the x-ray energy that is received at the scintillator material 44. Some of the light, however, is scattered and is reflected from an internal surface 62 of the housing toward a photodiode 46b, effectively adding noise to photodiode 46b. Such scattering may occur at various locations within the assembled housing portions 16, 18, and impact various ones of the photodiodes in photodiode array 42.

Figure 3B:
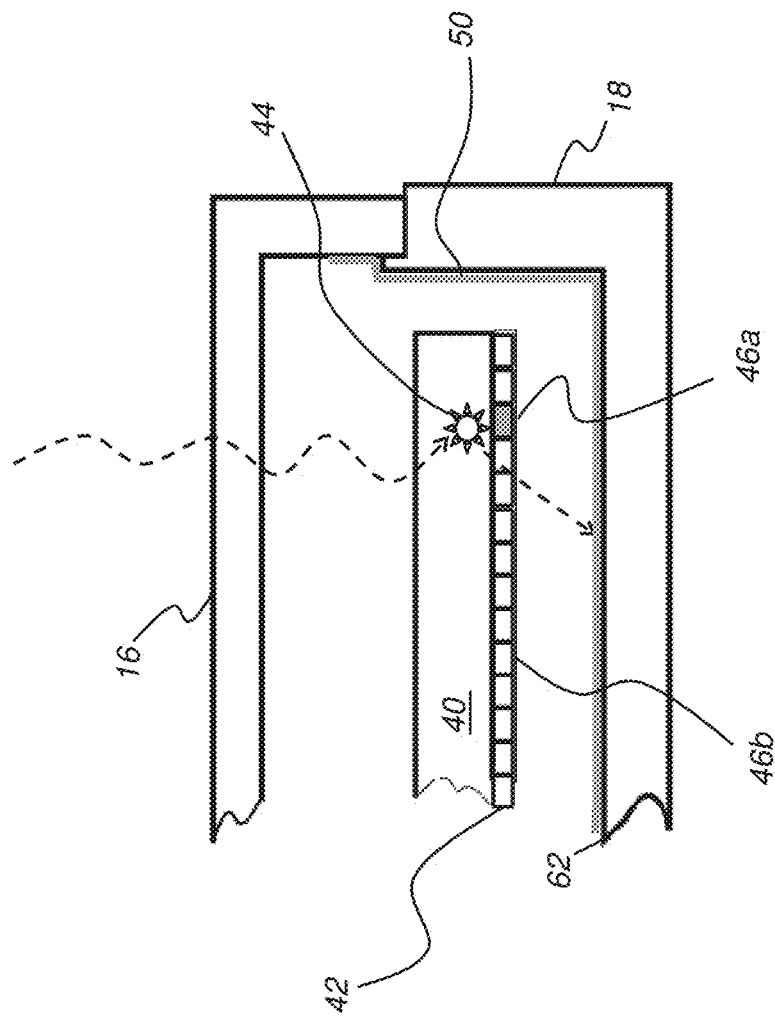
FIG. 3B is a side view that shows the DR detector with a light-absorbing CNT coating.

FIG. 3B shows CNTs deposited onto one or more surfaces 62 of the DR detector housing portion 18. CNTs may be deposited as a layer 50 over at least portions of the internal surfaces of the DR detector. Stray light is thereby absorbed by the CNT material. VANTA materials can be formed onto the internal surfaces of housing 14 or onto surfaces that are most likely to receive incident light, such as surfaces nearest scintillator materials or areas that are close to seams, connectors, and other features through which ambient light can penetrate.

CNT regions can also be formed to suppress reflection from internal surfaces of a CR reader. There are a number of types of CR plate readers and scanning apparatus that provide excitation light to the photostimulable phosphor in order to extract the stored image data after an x-ray exposure. Inner portions of the CR cassette can also be provided with CNT coatings.

Unlike other types of coatings, CNT arrays are grown on the target surface, requiring processing under controlled vacuum and heat conditions that may not be compatible with all materials or components used for the DR detector or within the CR cassette or reader. There can be practical considerations that relate to which regions of a surface benefit most from CNT formation.

Because CNT features can be formed having different heights, diameters, and number of walls within which tubes are formed, some spectral tuning is available in the nanotube fabrication process. Thus, for example, light absorption may be optimized to target different wavelengths of the electromagnetic spectrum. A number of filtering effects may be provided, forming CNT arrays that have different spectral characteristics in different regions of the DR detector, for example.

Figure 3C:
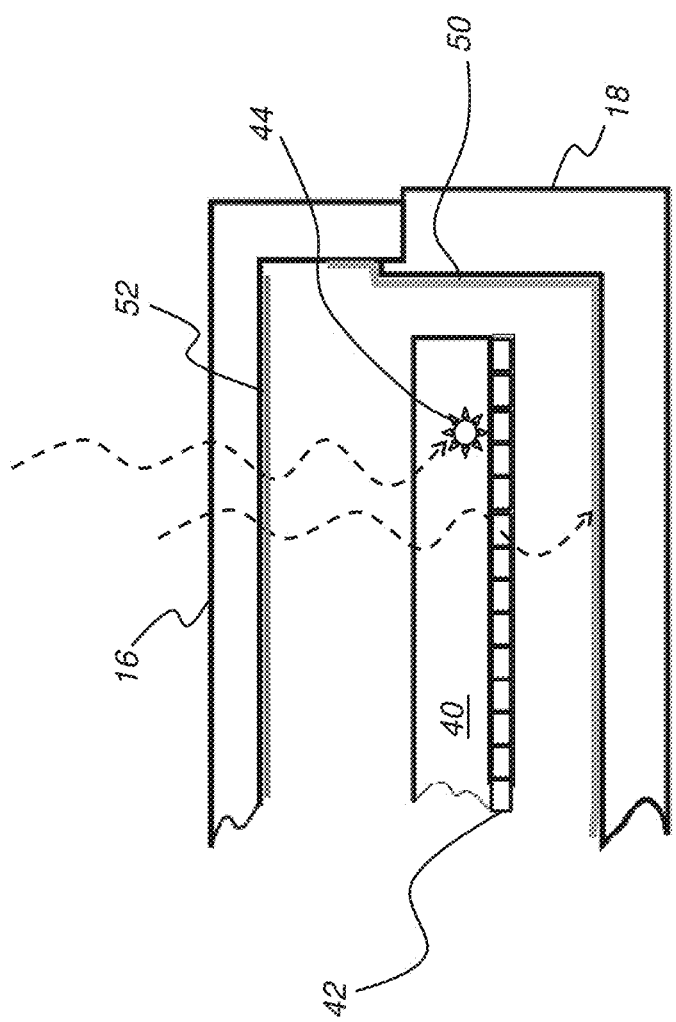
FIG. 3C is a side view that shows the DR detector with a second light-absorbing CNT coating, wherein the first CNT coating is x-ray absorbent.

According to an embodiment of the present disclosure, a CNT array is formed with nanotube structures that can be "tuned", that is, designed to be spectrally selective, providing different amounts of transmission or absorption for incident electromagnetic energy according to its wavelength. Thus, for example, CNT structures can be formed that absorb light wavelengths in visible or near-visible range, such as energy emitted from the scintillator layer or storage phosphor material of the x-ray detector, but transmit x-rays with little or no perceptible absorption. The schematic side view of FIG. 3C shows an embodiment of a DR detector that has an additional layer 52 that is transmissive of x-ray energy but absorbs visible light or light in the NIR-UV range.

Conversely, CNT structures that transmit light in the range from UV to IR wavelengths, but absorb at least some amounts of x-ray radiation, may also be formed. Referring again to FIG. 3C, layer 50 is optimized for x-ray absorption and may or may not be absorbent of light energy at other wavelengths. In this way, CNT layers can be used to form selective filters that can be used on one or more surfaces within a DR detector or CR storage or reading apparatus.

According to an embodiment of the present disclosure, an aligned CNT array is formed having high absorption for x-ray radiation. This arrangement allows one or more lightweight CNT layers to substitute for some or all of the lead shielding that may otherwise be used in the DR detector. There is a consequent reduction in weight in this embodiment, due to reducing the amount of lead that is required. Similar improvements in the weight of CR detectors and other equipment can also be realized using this feature. FIG. 3D shows an embodiment of the present disclosure in which layer 50 provides a measure of x-ray absorption, but is not sufficiently absorptive to meet requirements for the DR device. An additional layer 54 of lead or other highly dense material is used to supplement the absorption that is provided from layer 50. However, because layer 50 provides at least some absorption, layer 54 can be reduced in thickness over conventional applications and so provide reduced weight advantages.

According to an embodiment of the present disclosure, multiple layers of CNT arrays are combined in order to provide filtering effects or allow other more complex absorption characteristics. Thus, for example, with respect to FIG. 3D, layer 50 can be a composite structure, having a combination of component layers, each having CNT features that provide a particular energy absorption characteristic.

Figure 4A:
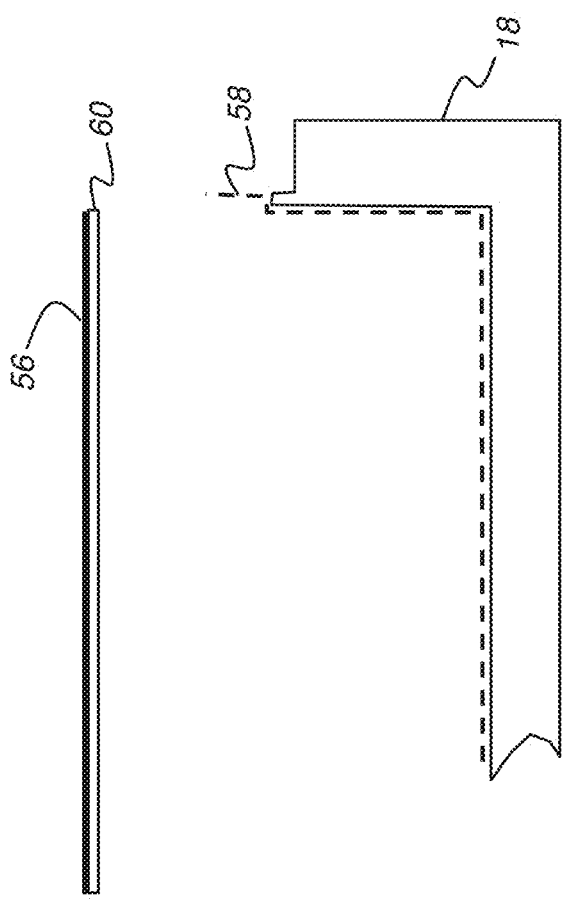
FIG. 4A is a side view that shows a foil having a CNT coating and conformable to the surface of a housing element.

Although arrays of carbon nanotubes can be formed at relatively low temperatures, there are still some limitations related to the types of materials on which a CNT coating can be formed. Plastics, for example, may not withstand the needed temperature levels for CNT growth and application. For such materials, one method that may be used is coating an intermediate material, then adhering or otherwise coupling the CNT-coated intermediate material onto the plastic or other material. Referring to FIG. 4A, a foil is coated as an intermediate sheet 60 with a CNT layer 56. Foil used as intermediate sheet 60 can be an aluminum foil, for example. The CNT coating renders an aluminum foil surface to be very highly absorbent, making it difficult to discern surface creases and irregularities, for example. The coated foil or other sheet 60 can then be adhered or otherwise bonded or coupled to housing cover portion 18 and conformed to a desired form 58 shown in dashed line form, for example. One or both sides of foil 60 or other intermediate material can be coated with a CNT array, as needed.

Figure 4B:
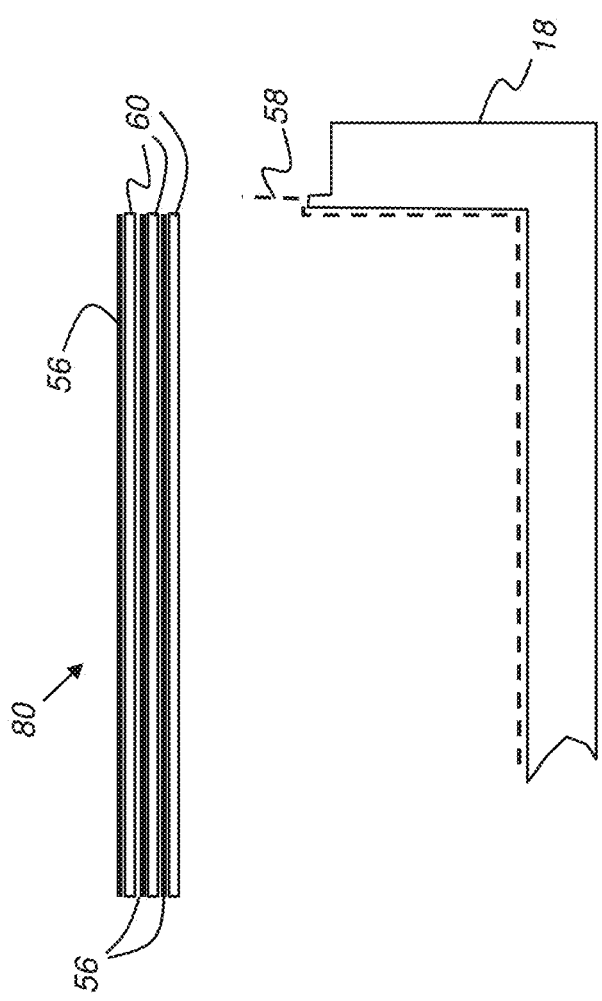
FIG. 4B is a side view that shows a laminate having multiple CNT coatings for bonding to the surface of a housing element.

Referring to the exploded view shown in FIG. 4B, multiple coated layers of foil or other intermediate sheet 60 material can be fitted and bonded together to form a laminate 80 having multiple layers of vertically aligned carbon nanotube arrays. Each CNT layer 56 can be individually configured to absorb a particular set of electromagnetic wavelengths that may or may not overlap. The laminate can then be bonded to a surface of a CR or DR detector or other component.

Figure 5:
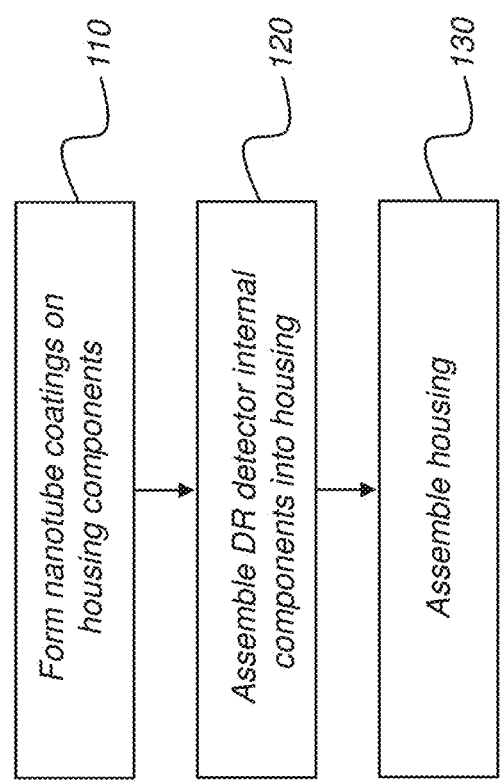
FIG. 5 shows steps in a workflow for assembling a radiographic detector according to an embodiment of the present disclosure.

The flow diagram of FIG. 5 shows a sequence for assembling a radiographic detector according to an embodiment of the present disclosure. In a coating step 110, at least one layer of aligned carbon nanotubes is applied to a portion of a first housing part. Step 110 can be performed by forming the carbon nanotubes on the housing part itself, under the appropriate energy, temperature, and pressure conditions, or on an intermediate that is conformed to the housing part, as described with reference to FIG. 4A. In a component assembly step 120, internal components of the radiographic detector are assembled, as described with reference to FIG. 1. The internal components include at least an array of photoimaging pixels, shown as detector 20. In a housing assembly step 130, the housing covers 16, 18 or other housing parts are attached to each other to form an assembled housing 14. Covers 16 and 18, as first and second housing parts attached to each other, form an enclosure surrounding the assembled internal components. Portions of the first housing part and second housing part can be at least partially abutted against each other.

Figure 6:
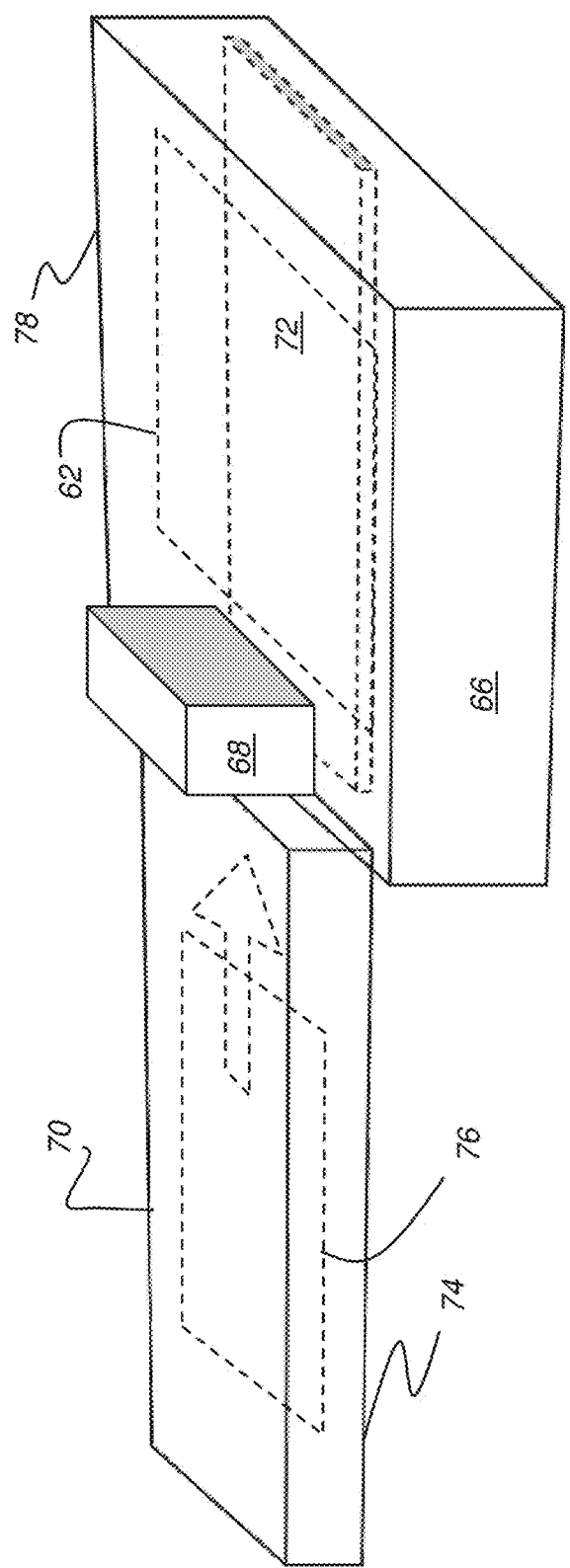
FIG. 6 is a schematic diagram that shows coatings used for a CR reader.

FIG. 6 is a schematic diagram that shows CNT coatings used for a CR reader. Within housing 74, a first coating formed from a CNT array is provided on surface 76. This can be an x-ray absorptive coating, for example. Within housing 78 of CR reader 66, a second coating formed as a CNT array is provided on surface 62. This can be a coating that is designed to absorb visible light or electromagnetic energy that is used to energize the storage phosphor during image scanning (readout).

Advantageously, the use of nanotechnology and coatings with substantial nanoparticulate content can reduce the weight of the DR detector and can help to eliminate at least a portion of seals, gaskets, conventional coatings, and other preventive devices and treatments that have previously been used for protection of DR detectors from ambient and scattered light. These CNT coatings can withstand heat, cleaning, and abrasion, and allow disassembly of the DR detector, such as for battery replacement, upgrade, or repair, for example.

The invention has been described in detail, and may have been described with particular reference to a suitable or presently preferred embodiment, but it will be understood that variations and modifications can be effected within the spirit and scope of the invention. In addition, while a feature(s) of the invention can have been disclosed with respect to only one of several implementations/embodiments, such feature can be combined with one or more other features of other implementations/embodiments as can be desired and/or advantageous for any given or identifiable function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A planar radiographic imaging device comprising:
    a plurality of electromagnetic radiation sensitive elements disposed in a two-dimensional array;
    a housing enclosing the two-dimensional array of radiation sensitive elements; and
    a layer of aligned carbon nanotubes on a surface of the housing.

2. The device of claim 1, wherein the radiation sensitive elements comprise a photostimulable material that reacts to electromagnetic radiation within a spectrum of wavelengths that includes visible light wavelengths.

3. The device of claim 2, wherein the carbon nanotubes are vertically aligned in a direction orthogonal to the surface of the housing.

4. The device of claim 2, wherein the imaging device is configured to be placed in a computed radiography reader to digitize the array of radiation sensitive elements.

5. The device of claim 1, wherein the radiation sensitive elements comprise a photostimulable material that is configured to be energized by electromagnetic radiation within a spectrum of wavelengths that includes ionizing wavelengths and to remain energized for a finite time.

6. The device of claim 5, wherein the imaging device is configured to be placed in a computed radiography reader to digitize the array of radiation sensitive elements within the finite time.

7. The device of claim 1, wherein the radiographic imaging device comprises a digital radiation detector, and wherein the radiation sensitive elements each comprise a photosensitive pixel controllably connected to an electronic memory through a readout switch.

8. The device of claim 7, wherein the readout switch comprises a thin film transistor and the photosensitive pixel comprises a photosensitive diode.

9. The device of claim 1, wherein the surface of the housing comprises aluminum.

10. The device of claim 1, wherein the housing comprises a material having a melting point of about 450° C. or greater.

11. A method of assembling a radiographic detector, the method comprising:
    assembling internal components of the radiographic detector, the internal components comprising at least an array of photoimaging pixels;
    applying a layer of aligned carbon nanotubes to a portion of a first housing part; and
    attaching the first housing part to a second housing part such that the portion of the first housing part faces a portion of the second housing part and the first and second housing parts form an enclosure surrounding the assembled internal components.

12. The method of claim 11, further comprising applying a layer of the aligned carbon nanotubes to the portion of the second housing part.

13. The method of claim 12, further comprising at least partially abutting the portion of the first housing part against the portion of the second housing part.

14. A radiographic image recording apparatus comprising:
    a recording medium that is energizable to generate a light output corresponding to an x-ray exposure;
    a housing that encloses the recording medium during light output generation and that comprises at least one surface facing the, recording medium; and
    a coating of aligned carbon nanotubes coupled to the at least one surface of the housing.

15. The apparatus of claim 14 wherein the recording medium comprises a storage phosphor of a computed radiography cassette.

16. The apparatus of claim 14 wherein the recording medium comprises a scintillator layer of a digital radiography detector.

17. The apparatus of claim 14 wherein the coating absorbs x-ray energy.

18. The apparatus of claim 14 wherein the coating absorbs visible light energy.

19. The apparatus of claim 14 wherein the coating is formed on an intermediate sheet attached to the at least one surface of the housing.

20. The apparatus of claim 14 wherein the coating comprises a laminate having two or more layers of the aligned carbon nanotubes.

* * * * *